Aug. 26, 1924.
W. F. WELTY
1,506,210
EDUCATIONAL DEVICE
Filed Oct. 4 1921
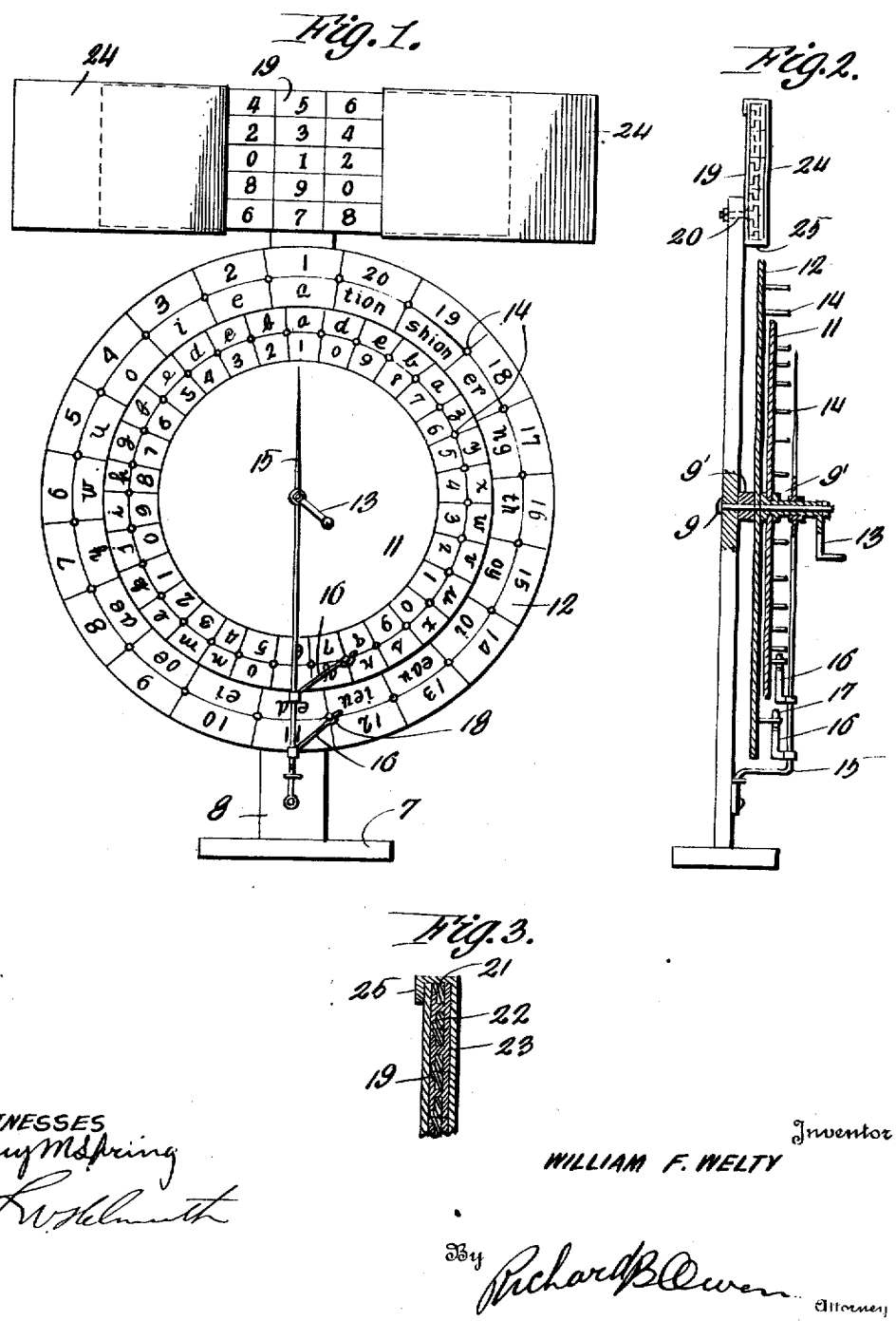
WITNESSES
WILLIAM F. WELTY, Inventor Patented Aug. 26, 1924.

1,506,210

UNITED STATES PATENT OFFICE.

WILLIAM F. WELTY, OF CUMBERLAND, NEW MEXICO.

EDUCATIONAL DEVICE.

Application filed October 4, 1921. Serial No. 505,356.

*To all whom it may concern:*

Be it known that I, WILLIAM F. WELTY, citizen of the United States, residing at Cumberland, in the county of Chaves and State of New Mexico, have invented certain new and useful Improvements in Educational Devices, of which the following is a specification.

This invention relates to new and useful improvements in educational devices.

The primary object of the invention is to provide a device of the above nature which will not only develop the intellectual powers of students but will accomplish this purpose in a manner to develop alertness of the mind, that is to render it quickly and accurately responsive, this object being accomplished by providing a plurality of independently and simultaneous movable members equipped with numerals, letters, etc., whereby all of said members may be set into motion and stopped instantaneously, thereby presenting to the student a problem for him to solve without hesitancy.

Another important object of the invention is to provide means for positively retarding movement of the members in order to prevent further uncertain movement thereof between determinable points.

Still another object of the invention is to provide in combination a plurality of rotatable members and slidable members containing various numerals, letters, and combination thereof, all of said members being independently movable.

Still another object of the invention is to provide an educational device including a chart having various numbers, etc., thereon and means movable independently thereof for pointing out an individual problem to the exclusion of other numerals on the chart.

Other objects and advantages of the invention will become apparent during the course of the following description.

In the accompanying drawing forming a part of the application and wherein like numerals are employed to designate like parts throughout the several views, Figure 1 is a plan of the invention.

Figure 2 is a side elevation thereof parts being shown in section, and

Figure 3 is a fragmentary vertical section of the chart.

Referring now to the drawing wherein for the purpose of illustration is shown the preferred embodiment of my invention, the numeral 7 designates a base which may be rigidly, hingedly or otherwise positioned upon a suitable support. From the base rises a back or standard 8 upon which the movable members of the device are mounted. It will of course, be understood that the standard or back may be used independently of the base 7 and suspended upon a suitable support when it is desired to elevate the device higher than provided for by the base 7. As best seen in Figure 2, an axle 9 is secured to the standard to project forwardly of the front face thereof to rotatably mount a plurality of disks 10 and 11, two being used in the present instance but obviously as many may be used as desired. These disks are of varying diameters the smaller disk 11 being mounted adjacent the outermost end of the axle while the larger disk 12 is mounted behind the small disk and adjacent the standard. It will be seen that the margin of the larger disk extends beyond the periphery of the smaller disk so that the various indicia placed upon the marginal edges of the disks may be clearly visible. In the present instance, the marginal edge of the smaller disk is provided with an inner circle of numerals ranging from zero to 9 and a repetition thereof around the circumference of the disk, and also a larger circle of indicia containing the alphabet and as many other characters as are required to complete the circle in case the alphabet does not completely fill the spaces provided in the circle. The next larger disk is provided with vowels, suffixes, prefixes, diphthongs, and any other combination of letters found desirable. It is also provided with an outer circle of numerals ranging in the present instance, from 1 to 20, but obviously any other range of numerals or figures may be used if desired.

The central portion of each disk is provided with a sleeve 9' through which extends the axle 9, whereby the disks are independently rotatable. The sleeve of the smaller disk 11 has secured thereto a crank handle 18 whereby it may be conveniently rotated, it being understood that rotation of the large disk is effected by the operator spinning the same separately.

The numerals, letters, etc., of each disk are separated by radial dividing lines as best seen in Figure 1, and secured to the disks at the lines of demarcation thereon are laterally projecting pins 14 which form part of the means for retarding rotation of the disks. The means cooperating with the pins consists of a pointer 15 secured at its lower end to the standard 8 in any suitable manner below the disks and projects forwardly therefrom to provide a support for upwardly extending resilient members 16, one being provided for each disk. These resilient members preferably consist of pieces of resilient metal 17 which have their lower ends bent and fastened to the pointer 15 and incline upwardly and outwardly toward one side of the device. The outer end 17 of each strip projects into the path of movement of the pins of its respective disk and is provided with an offset portion 18 forming a pocket into which the pins 14 may seat. From this particular construction of the members 16 it will be obvious that the disks will be positively stopped as their rate of rotation decreases, thereby obviating the uncertainty as to where the disks stop, which is a common fault in well known "paddle wheels." The upper end of the pointer rises vertically and is supported in upright position by the sleeve 9' of the small disk extending through an opening provided between the ends of the pointer. Due to the arrangement of the pointer a support for the outer end of the axle is provided. The upper free end of the pointer is disposed adjacent the periphery of the smaller disk and is used for pointing to the indicia on the two disks. It will be noted that the inner end of the sleeve of the small disk is equipped with a pair of spaced flanges between which the center portion of the small disk seats to be fastened thereto. The center portion of the large disk is loosely mounted between the inner flange of said sleeve and a collar mounted on the axle as shown. In order to increase the complexity of the problems when desired, a chart 19 is supported above the disks by a bolt 20 countersunk in the standard 8 above the disks. This chart in the present instance is provided with a plurality of horizontal grooves or passages 21 which may be formed by grooving the chart or providing spaced guides 22, between each pair of which is guided a slide 23 having on the face thereof a plurality of vertical lines between which are printed or otherwise provided, numbers, letters or the like, and on the backs thereof T-shaped extensions to fit the guides. It will therefore be obvious that the slides 23 may be manipulated to cause the lines thereof to align to form a plurality of vertical columns of figures or letters.

Other means are also provided for definitely outlining the particular problem desired to be solved and which consists of a pair of plates 24 each of which has a pair of its opposite marginal edges 25 bent to overlap the upper and lower edges of the chart 19 as clearly seen in Figures 2 and 3. By this construction, it will be seen that the plates 24 are slidable upon the chart and when moved so that their inner edges abut, will completely conceal the various indicia upon the chart. The plates may be moved or shifted from one side of the chart to the other so that any chosen row of indicia on the slides 23 may be viewed between the plates while the remaining rows are concealed behind the plates. By reason of the fact that the chart 19 is arranged directly above the rotating disks, it will be obvious that when the disks stop rotating, the rows of indicia, or at least one row thereof on the chart will be arranged directly under one or more rows of the chart so that long rows of figures may be presented to the student for addition or other problems. The front of these plates is equipped with writing surfaces such as that given to black boards whereby other problems than those provided on the chart may be presented to the student.

To illustrate the use of the device it will be obvious that the small disk 11 may be rotated and a student called upon to give a word beginning with the letter stopping at the pointer. The large disk 10 may be rotated at varying speeds and a student called upon to form a word beginning with one of the letters on the disk 11 and ending with whichever suffix stops at the top of the disk 12. Furthermore, the disks may be caused to rotate at various speeds and the student called upon to solve problems with the indicia which stop at the pointer. In view of the fact that the disks are independently rotatable and may be stopped simultaneously by hand the student will be held in suspense with his mind alert to quickly calculate the numbers stopping at the top of the disks. In educational devices wherein only one disk is rotatable, the student has an opportunity to ascertain one of the numbers prior to the stopping of the rotatable disk and therefore is not called upon to exercise the alertness necessary to quickly solve a problem with my present invention. To render the problems more intricate, the chart 19 may be used in conjunction with the rotatable disks whereby different rows of figures may be selected to be added in connection with numbers on the rotating disks. It will therefore be obvious that besides providing a highly educational device for the school room, one has been provided which will prove interesting to juvenile students who will delight in the use of such devices at home and will therefore rapidly develop their intellectual powers and render them extremely alert and accurate.

The foregoing description and accompanying drawing having reference to what might be considered to be the approved or preferred form of my invention, I desire it to be understood that I may make such changes in the construction, combination and arrangement of parts, materials, dimensions, etc., as may prove expedient and fall within the scope of the appended claims.

Having thus fully described my invention what I claim as new and desire to secure by Letters Patent, is:

1. A device of the character specified comprising a dial rotatably mounted thereon, said dial being provided with a plurality of projecting pins, and a resilient member adapted to brush the pins as the dial revolves, and said resilient member being provided with a recess adapted to receive one of the pins of the dial when the latter comes to a standstill.

2. An educational device comprising a standard, a disk rotatably mounted thereon, said disk being provided with a plurality of circumferentially spaced pins, a resilient member secured to said standard and projecting into the path of said pins, said member being inclined relative to the standard and provided with an offset portion for receiving any one of said pins.

In testimony whereof I affix my signature in presence of two witnesses.

WILLIAM F. WELTY.

Witnesses:
H. G. NISUERLY,
FANNIE E. JENNINGS.